(12) United States Patent
Stone

(10) Patent No.: US 7,895,439 B2
(45) Date of Patent: Feb. 22, 2011

(54) WATERMARKED MATERIAL PROCESSING

(75) Inventor: Jonathan James Stone, Reading (GB)

(73) Assignee: Sony Europe Limited, Surrey (GB)

( * ) Notice: Subject to any disclaimer, the term of this patent is extended or adjusted under 35 U.S.C. 154(b) by 1090 days.

(21) Appl. No.: 11/389,378

(22) Filed: Mar. 27, 2006

(65) Prior Publication Data

US 2006/0168452 A1    Jul. 27, 2006

Related U.S. Application Data

(63) Continuation of application No. 10/006,743, filed on Dec. 4, 2001, now Pat. No. 7,073,065, which is a continuation of application No. PCT/GB01/01475, filed on Mar. 30, 2001.

(30) Foreign Application Priority Data

Apr. 5, 2000    (GB) ................. 0008439.2
Aug. 14, 2000   (GB) ................. 0019977.8

(51) Int. Cl.
    *H04L 9/32*    (2006.01)
(52) U.S. Cl. ...................................... 713/176
(58) Field of Classification Search ............... 713/176; 380/201, 203

See application file for complete search history.

(56) References Cited

U.S. PATENT DOCUMENTS

| | | | | |
|---|---|---|---|---|
| 6,310,962 B1 * | 10/2001 | Chung et al. | ................ | 382/100 |
| 6,314,518 B1 * | 11/2001 | Linnartz | ..................... | 713/176 |
| 2003/0161496 A1 * | 8/2003 | Hayashi et al. | ............. | 382/100 |

FOREIGN PATENT DOCUMENTS

| | | |
|---|---|---|
| EP | 0 705 025 | 4/1996 |
| EP | 0 809 244 | 11/1997 |
| EP | 0 859 337 | 8/1998 |
| EP | 0 859 503 | 8/1998 |
| EP | 859503 A2 * | 8/1998 |
| EP | 0 908 881 | 4/1999 |
| EP | 0 926 897 | 6/1999 |
| EP | 0 944 256 | 9/1999 |
| GB | 2 326 048 | 12/1998 |
| GB | 2 328 579 | 2/1999 |
| JP | 6-284282 | 10/1994 |
| JP | 7-177348 | 7/1995 |
| JP | 7-327127 | 12/1995 |

(Continued)

OTHER PUBLICATIONS

SMPTE Journal, Proposed SMPTE Standard for Television—Unique Material Identifier (UMID), Mar. 2000, pp. 221-225.

(Continued)

*Primary Examiner*—Gilberto Barron, Jr.
*Assistant Examiner*—Samson B Lemma
(74) *Attorney, Agent, or Firm*—Oblon, Spivak, McClelland, Maier & Neustadt, L.L.P.

(57) ABSTRACT

A material (e.g. video, audio or data) processing system (648) processes material including a watermark. The system comprises a remover (640) for removing the watermark, a processor (646) for processing the material from which the watermark has been removed, and an inserter (642) for inserting a watermark into the processed material.

23 Claims, 4 Drawing Sheets

FOREIGN PATENT DOCUMENTS

| | | |
|---|---|---|
| JP | 11-119651 | 4/1999 |
| JP | 11-252355 | 9/1999 |
| JP | 11-266366 | 9/1999 |
| WO | WO 99/11064 | 3/1999 |
| WO | WO 00/04727 | 1/2000 |

OTHER PUBLICATIONS

Zhao, J., "A WWW Service to Embed and Prove Digital Copyright Watermarks", Proceedings of the European Conference on Multimedia Applications, Services and Techniques, vol. 2, May 28, 1996, pp. 695-706, XP00019921.

* cited by examiner

Basic and Extended UMID Structures

WATERMARKED MATERIAL PROCESSING

The present invention relates to a system and method for processing material. The material may be one or more of video material, audio material, and data material other than video and/or audio. Thus material is represented by an information signal, which preferably is a digital signal.

It is known to use watermarks in material for example video material to indicate the provenance of the material. However some processing may damage or destroy a watermark.

According to a first aspect of the present invention, there is provided a processing system for processing material including a watermark, the system comprising a remover for removing the watermark, a processor for processing the material from which the watermark has been removed, and an inserter for inserting a watermark into the processed material.

Thus the watermark is removed before processing and a watermark is inserted after processing, avoiding damage to a watermark. The watermark inserted after processing may be the same as the removed watermark or may be different.

In principle such a system could be under the control of a user of the processor. However, if the user can control the removal and insertion process, he could indulge in fraud. Thus to prevent fraud the removal and insertion process is preferably automatic and independent of the user. Most preferably it is performed without the knowledge of the user. Thus the material processing system is closed with respect to the removal and insertion of watermarks.

The removal and insertion of watermark may involve the use of data enabling those processes. Preferably, the enabling data is an encryption key. The enabling data may be securely stored or generated in the processor. Alternatively, the enabling data may be stored in and retrieved from a separate, preferably secure, database. The database may be linked, e.g. via a suitable communications link, to the system. Preferably, the link provides secure transfer of the enabling data.

According to a second aspect of the invention, there is provided a method of processing material including a watermark, comprising the steps of: removing the watermark; processing the material from which the watermark has been removed using a processor; and inserting a watermark into the processed material.

According to a third aspect of the invention, there is provided a method of removing data embedded in material comprising the steps of: receiving material in which data is embedded; accessing an information store storing information enabling the data to be removed; and removing the said data using the enabling data accessed from the store.

According to a fourth aspect of the invention, there is provided a method comprising the steps of: embedding data in material; and storing, in an information store, information for enabling the data to be removed from the material.

According to a fifth aspect of the invention, there is provided apparatus for removing data embedded in material comprising: an input for receiving material in which data is embedded; an information store for storing information enabling the data to be removed; and a remover arranged to remove the said data using the enabling data accessed from the store.

According to a sixth aspect of the invention, there is provided apparatus comprising: an embedder for embedding data in material; a store for storing information for enabling the data to be removed from the material.

For a better understanding of the present invention, there will now be described, by way of example, an illustrative embodiment of the invention with reference to the accompanying drawings, in which.

The following description illustrates the invention by way of reference to video material. However, the invention is not limited to video material.

Figure 1:
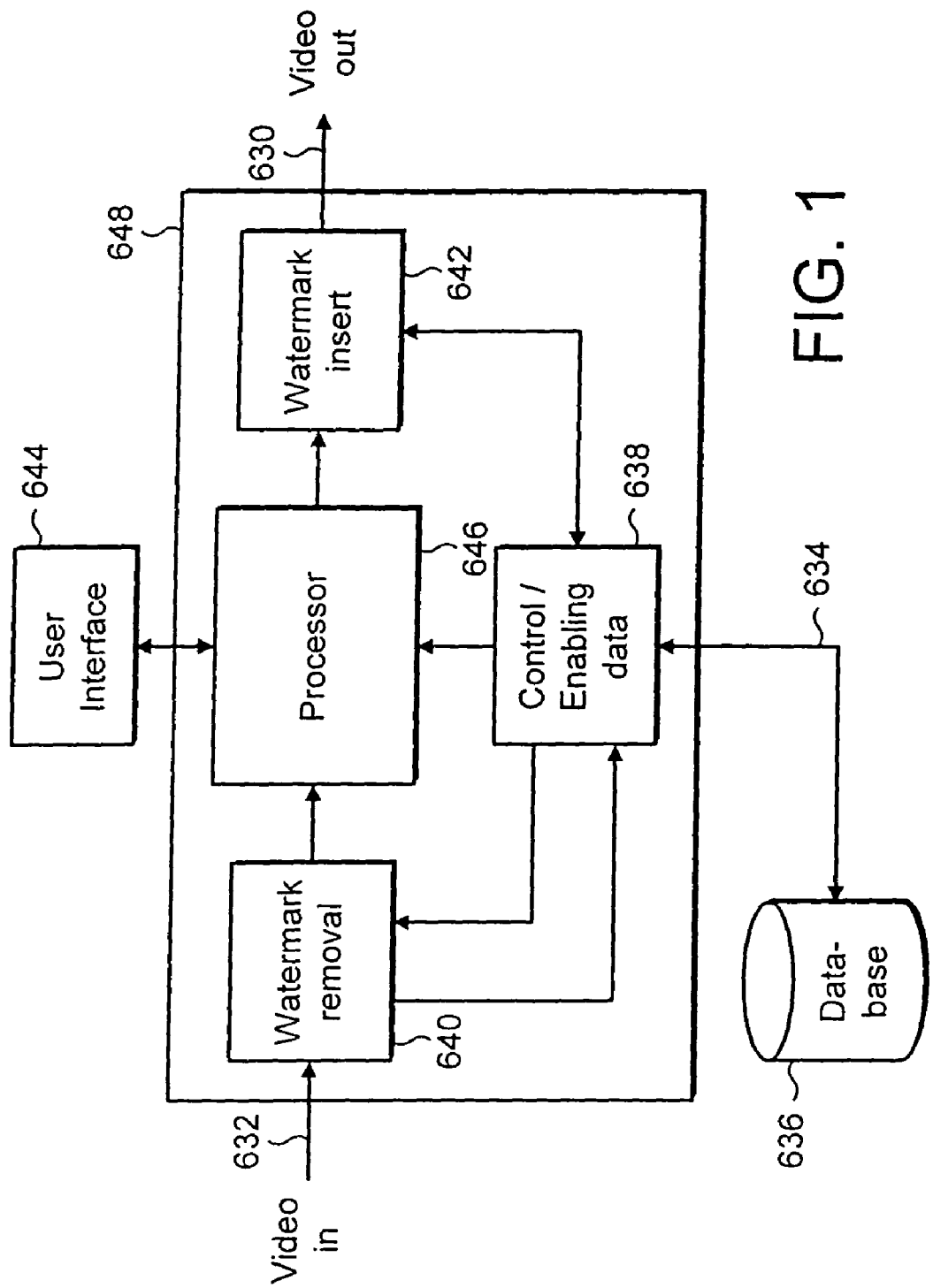
FIG. 1 is a schematic block diagram of an illustrative watermark insertion and removal system.

Overview—FIG. 1

Referring to FIG. 1, a video processing system 648 processes video material input at input 632 and outputs processed video at output 630. The system 648 includes a processor 646 which may be an editor, a special effects machine, a mixer or any other video processor. Whilst only one input and one output is shown, the processing system and the processor 646 may have a plurality of inputs and at least one output. If the processor 646 is a mixer for example it has two or more inputs.

The processor 646 has a user interface 644 having user controls (not shown) for controlling the processor 646.

The input material contains watermarks. Watermarks are described in the section watermarks below. Watermarks may be used to check the provenance of video material. Watermarks may identify the owners of the material. In a preferred embodiment of the invention, the watermarks identify the material (which we believe to be a novel idea). Most preferably the watermarks are based on UMIDs (which we believe to be a novel idea). UMIDs are described in the section UMIDs below.

In accordance with a preferred embodiment of the present invention, the processing system 648 is a closed system with respect to processing watermarks. That is the user has control only of the video processor 646 but no control of, nor access to, the watermark processing. The watermark processing is automatic and invisible to the user. In a preferred embodiment as shown in FIG. 1, system 648 is an integral unit comprising the remover 640, the processor 646, the inserter 642 and the contoller 638.

Thus in accordance with the present embodiment, watermarks of the material received at the input 632 (referred to herein as "input watermarks") are automatically removed in a remover 640 before video processing in the processor 646, and watermarks are automatically inserted by an inserter 642 into the processed video after processing. Removal and insertion of watermarks may require enablement by enabling data. That data may be stored and/or generated in the processing system 648 by a controller 638, and/or retrieved from a database 636 via a secure datalink 634. The datalink 634 may include the internet. The enabling data preferably includes UMIDs for the watermarks inserted after processing.

In a preferred embodiment, the enabling data includes encryption keys for removing and inserting encrypted watermarks.

The database 636 may store data for verifying the provenance of input material by checking the watermark against verification data which may be a UMID if the watermark comprises a UMID. The processor 646 may be disabled by the control 630 in the presence of material which fails verification. For example, the control 638 checks the authenticity of the material received at input 632. Preferably, if the authenticity check indicates that the received material is not authentic, the processor 646 is disabled. The data for verifying authenticity is preferably derived from the database 636.

The database 636 or another database (not shown) linked to it may store metadata relating to the video material. Examples of metadata are given in the section Metadata below.

The watermark inserter 642 may reinsert the input watermark in the processed video. Alternatively the inserter 642 may insert, into the processed video, a watermark different to that of the input watermark. For example, if the processor 646 is a mixer, and the watermark is a UMID, the processed video is effectively new material to which a new UMID is associated. Thus the inserter will usually insert a UMID different to the input UMID. The new UMID is preferably stored in the database 636 to link the processed material to its metadata.

Figure 2:
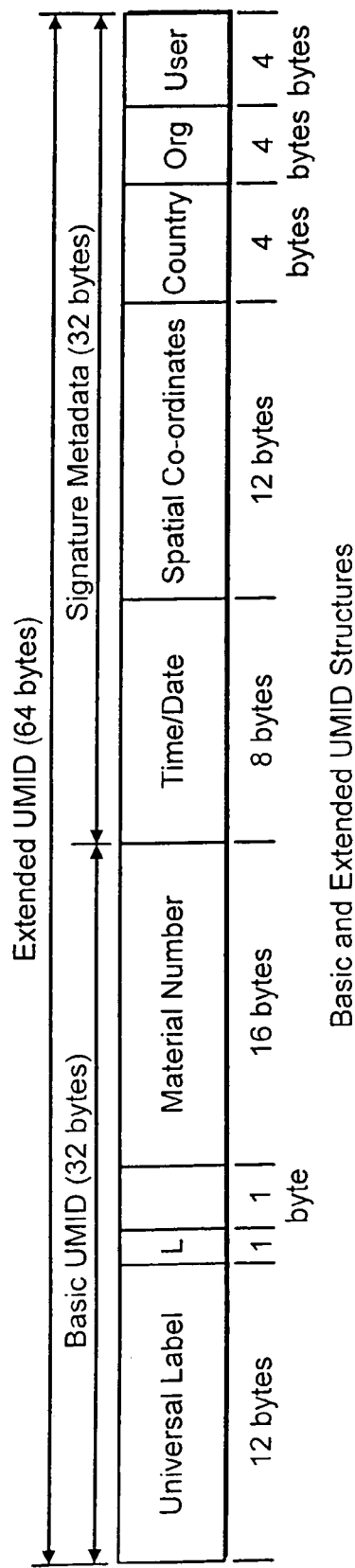
FIGS. 2 and 3 are schematic diagrams of data structures of UMIDs
Figure 3:
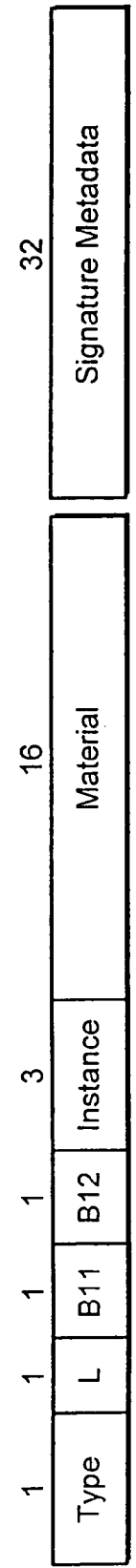

UMIDs—FIGS. 2 and 3.

UMIDs

A UMID is described in SMPTE Journal March 2000. Referring to FIG. 2, an extended UMID is shown. It comprises a first set of 32 bytes of basic UMID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes Each component of the basic and extended UMIDs will now be defined in turn.

The 12-Byte Universal Label

The first 12 bytes of the UMID provide identification of the UMID by the registered string value defined in table 1.

TABLE 1

Specification of the UMID Universal Label

| Byte No. | Description | Value (hex) |
| --- | --- | --- |
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |

TABLE 1-continued

Specification of the UMID Universal Label

| Byte No. | Description | Value (hex) |
| --- | --- | --- |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also the bytes 1-12 may have designations other than those shown by way of example in the table. Referring to the Table 1, in the example shown byte 4 indicates that bytes 5-12 relate to a data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed preassigned values. Byte 11 is variable. Thus referring to FIG. 3, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17th Nov. 1858 and allows dates to the year 4597.

The Spatial Co-Ordinate Format

The spatial co-ordinate value consists of three components defined as follows:

Altitude: 8 decimal numbers specifying up to 99,999,999 meters.

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Freelance Operators

Freelance operators may use their country of domicile for the country code and use the Organisation and User codes concatenated to e.g. an 8 byte code which can be registered with SMPTE. These freelance codes may start with the '~' symbol (ISO 8859 character number 7Eh) and followed by a registered 7 digit alphanumeric string.

It will be noted from the foregoing discussion that a UMID may be used to identify not only video material, but also audio material, data material, and a group of material.

Figure 4:
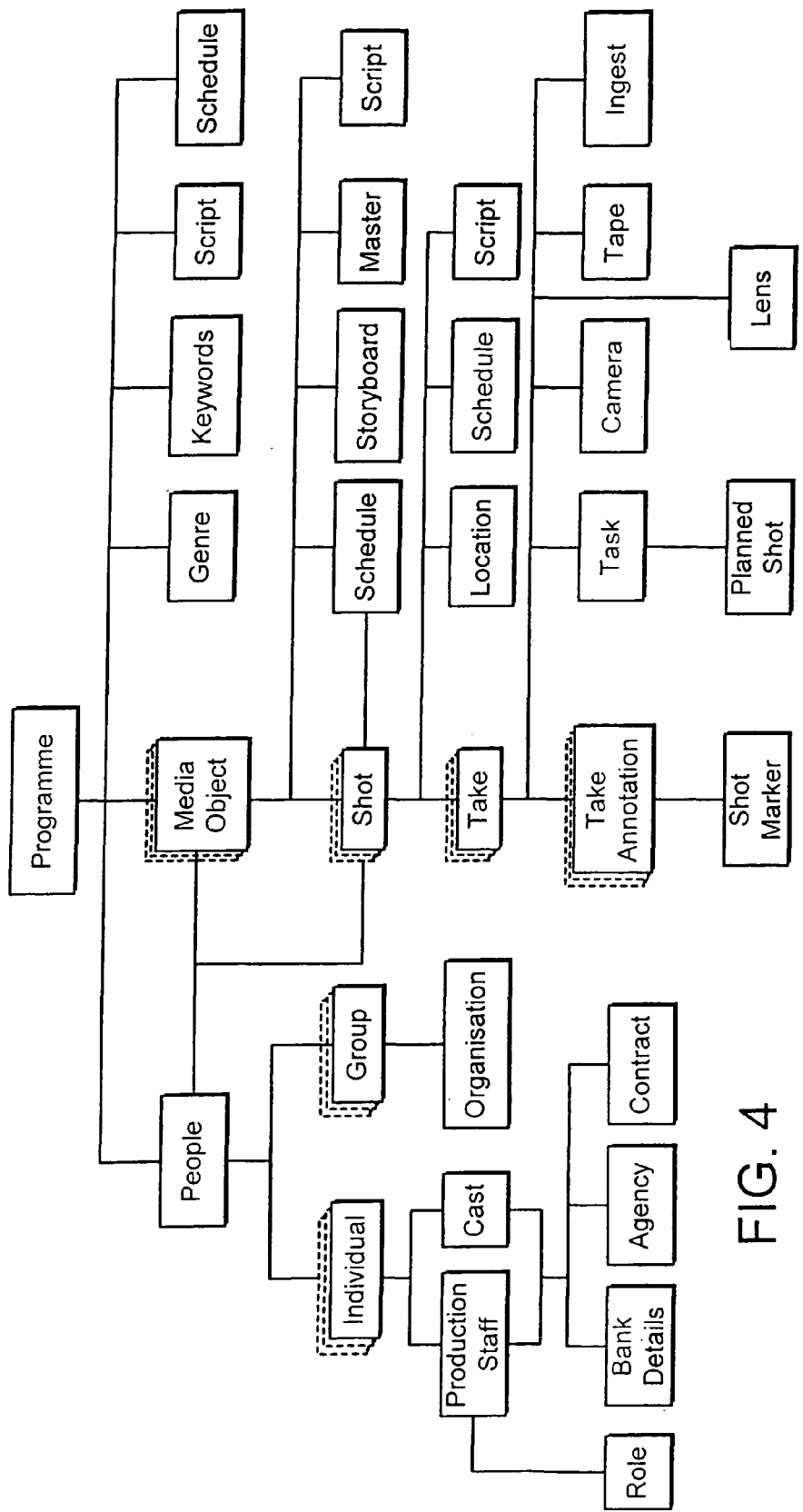
FIG. 4 is a schematic block diagram an illustrative data structure of a metadata base.

Metadata—FIG. 4

The following is provided, by way of example, to illustrate the possible types of metadata generated during the production of a programme, and one possible organisational approach to structuring that metadata in a database such as 636 in FIG. 1. A UMID embedded in video as a watermark acts as an identifier which links the video with the associated metadata in the database.

FIG. 4 illustrates an example structure for organising metadata. A number of tables each comprising a number of fields containing metadata are provided. The tables may be associated with each other by way of common fields within the respective tables, thereby providing a relational structure. Also, the structure may comprise a number of instances of the same table to represent multiple instances of the object that the table may represent. The fields may be formatted in a predetermined manner. The size of the fields may also be predetermined. Example sizes include "Int" which represents 2 bytes, "Long Int" which represents 4 bytes and "Double" which represents 8 bytes. Alternatively, the size of the fields may be defined with reference to the number of characters to be held within the field such as, for example, 8, 10, 16, 32, 128, and 255 characters.

Turning to the structure in more detail, there is provided a Programme Table. The Programme Table comprises a number of fields including Programme ID (PID), Title, Working Title, Genre ID, Synopsis, Aspect Ratio, Director ID and Picturestamp. Associated with the Programme Table is a Genre Table, a Keywords Table, a Script Table, a People Table, a Schedule Table and a plurality of Media Object Tables.

The Genre Table comprises a number of fields including Genre ID, which is associated with the Genre ID field of the Programme Table, and Genre Description.

The Keywords Table comprises a number of fields including Programme ID, which is associated with the Programme ID field of the Programme Table, Keyword ID and Keyword.

The Script Table comprises a number of fields including Script ID, Script Name, Script Type, Document Format, Path, Creation Date, Original Author, Version, Last Modified, Modified By, PID associated with Programme ID and Notes. The People Table comprises a number of fields including Image.

The People Table is associated with a number of Individual Tables and a number of Group Tables. Each Individual Table comprises a number of fields including Image. Each Group Table comprises a number of fields including Image. Each Individual Table is associated with either a Production Staff Table or a Cast Table.

The Production Staff Table comprises a number of fields including Production Staff ID, Surname, Firstname, Contract ID, Agent, Agency ID, E-mail, Address, Phone Number, Role ID, Notes, Allergies, DOB, National Insurance Number and Bank ID and Picture Stamp.

The Cast Table comprises a number of fields including Cast ID, Surname, Firstname, Character Name, Contract ID, Agent, Agency ID, Equity Number, E-mail, Address, Phone Number, DOB and Bank ID and Picture Stamp. Associated with the Production Staff Table and Cast Table are a Bank Details Table and an Agency Table.

The Bank Details Table comprises a number of fields including Bank ID, which is associated with the Bank ID field of the Production Staff Table and the Bank ID field of the Cast Table, Sort Code, Account Number and Account Name.

The Agency Table comprises a number of fields including Agency ID, which is associated with the Agency ID field of the Production Staff Table and the Agency ID field of the Cast Table, Name, Address, Phone Number, Web Site and E-mail and a Picture Stamp. Also associated with the Production Staff Table is a Role Table.

The Role Table comprises a number of fields including Role ID, which is associated with the Role ID field of the Production Staff Table, Function and Notes and a Picture Stamp. Each Group Table is associated with an Organisation Table.

The Organisation Table comprises a number fields including Organisation ID, Name, Type, Address, Contract ID, Contact Name, Contact Phone Number and Web Site and a Picture Stamp.

Each Media Object Table comprises a number of fields including Media Object ID, Name, Description, Picturestamp, PID, Format, schedule ID, script ID and Master ID. Associated with each Media Object Table is the People Table, a Master Table, a Schedule Table, a Storyboard Table, a script table and a number of Shot Tables.

The Master Table comprises a number of fields including Master ID, which is associated with the Master ID field of the Media Object Table, Title, Basic UMID, EDL ID, Tape ID and Duration and a Picture Stamp.

The Schedule Table comprises a number of fields including Schedule ID, Schedule Name, Document Format, Path, Creation Date, Original Author, Start Date, End Date, Version, Last Modified, Modified By and Notes and PID which is associated with the programme ID.

The contract table contains: a contract ID which is associated with the contract ID of the Production staff, cast, and organisation tables; commencement date, rate, job title, expiry date and details.

The Storyboard Table comprises a number of fields including Storyboard ID, which is associated with the Storyboard ID of the shot Table, Description, Author, Path and Media ID.

Each Shot Table comprises a number of fields including Shot ID, PID, Media ID, Title, Location ID, Notes, Picturestamp, script ID, schedule ID, and description. Associated with each Shot Table is the People Table, the Schedule Table, script table, a Location Table and a number of Take Tables.

The Location Table comprises a number of fields including Location ID, which is associated with the Location ID field of the Shot Table, GPS, Address, Description, Name, Cost Per Hour, Directions, Contact Name, Contact Address and Contact Phone Number and a Picture Stamp.

Each Take Table comprises a number of fields including Basic UMID, Take Number, Shot ID, Media ID, Timecode IN, Timecode OUT, Sign Metadata, Tape ID, Camera ID, Head Hours, Videographer, IN Stamp, OUT Stamp. Lens ID, AUTOID ingest ID and Notes. Associated with each Take Table is a Tape Table, a Task Table, a Camera Table, a lens table, an ingest table and a number of Take Annotation Tables.

The Ingest table contains an Ingest ID which is associated with the Ingest Id in the take table and a description.

The Tape Table comprises a number of fields including Tape ID, which is associated with the Tape ID field of the Take Table, PID, Format, Max Duration, First Usage, Max Erasures, Current Erasure, ETA (estimated time of arrival) and Last Erasure Date and a Picture Stamp.

The Task Table comprises a number of fields including Task ID, PID, Media ID, Shot ID, which are associated with the Media ID and Shot ID fields respectively of the Take Table, Title, Task Notes, Distribution List and CC List. Associated with the Task Table is a Planned Shot Table.

The Planned Shot Table comprises a number of fields including Planned Shot ID, PID, Media ID, Shot ID, which are associated with the PID, Media ID and Shot ID respectively of the Task Table, Director, Shot Title, Location, Notes, Description, Videographer, Due date, Programme title, media title Aspect Ratio and Format.

The Camera Table comprises a number of fields including Camera ID, which is associated with the Camera ID field of the Take Table, Manufacturer, Model, Format, Serial Number, Head Hours, Lens ID, Notes, Contact Name, Contact Address and Contact Phone Number and a Picture Stamp.

The Lens Table comprises a number of fields including Lens ID, which is associated with the Lens ID field of the Take Table, Manufacturer, Model, Serial Number, Contact Name, Contact Address and Contact Phone Number and a Picture Stamp.

Each Take Annotation Table comprises a number of fields including Take Annotation ID, Basic UMID, Timecode, Shutter Speed, Iris, Zoom, Gamma, Shot Marker ID, Filter Wheel, Detail and Gain. Associated with each Take Annotation Table is a Shot Marker Table.

The Shot Marker Table comprises a number of fields including Shot Marker ID, which is associated with the Shot Marker ID of the Take Annotation Table, and Description.

Figure 5:
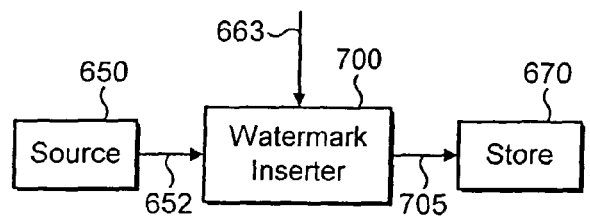
FIGS. 5 and 6 are schematic diagrams of watermarking insertion techniques.
Figure 6:
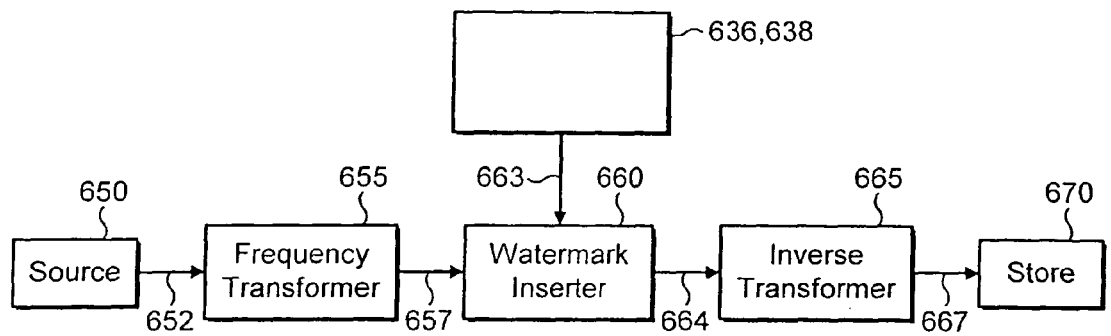

Watermarks—FIGS. 5 and 6

There is an ever increasing amount of information, and particularly video, being recorded, stored and distributed digitally. The ease with which this information may be duplicated is a concern, since any copyrights in the underlying works may potentially be easily infringed by unauthorised copying. Accordingly, copyright owners may be unwilling to make available and distribute their works without adequate protection against copying, or without being able to demonstrate that a particular example of work originates from them and may be an infringing unauthorised copy.

One possible technique which seeks to provide a solution to this problem is digital watermarking. Digital watermarking allows a code to be embedded in a digital work which contains information which may, for example, identify the owner, the distributor and/or an authorisation code. The digital watermark may be used in conjunction with other deterrents such as encryption.

The digital watermark, hereinafter referred to as the watermark, should be unique such that it, for example, unambiguously identifies the owner, the distributor and/or provides an authorisation code, a technique often referred to a fingerprinting. Also, the watermark may itself be a digital work such as an image, audio or video. The watermark may also contain an indication of whether the work may be copied freely, not copied at all or copied a predetermined number of times.

Preferably, the watermark should be undetectable, unalterable and non-removable by unauthorised individuals. Also, the watermark should not adversely degrade the underlying work in a manner that is readily perceptible. However, the watermark should be readily discernible by authorised individuals such that the owner and/or distributor may be identified.

The watermark should be easily embedded into the underlying digital work. Preferably, the embedding technique should be such that that this can be easily performed during recording, thereby watermarking the work at source, and thus minimising the possibility of any non-watermarked works being available.

The watermark may be placed in, for example, a header or label of a digital work, or the watermark may be embedded within the data fields of the digital work itself. Preferably, the watermark is reproduced many times within a work and, more preferably, is present in every frame of the digital work. Alternatively, the watermark may be placed directly onto the media which carries the digital work.

The watermark may be robust such that it may not be removed or degraded by individuals seeking to make unauthorised copies. Unauthorised attempts to remove the robust watermark should result in severe degradation of the data, rendering the data useless. Situations where the data contains much redundant information, such as in video, may render the robust watermark susceptible to attack by, for example, frame dropping or the like. Hence, the robust watermark should preferably withstand such attacks and may, for example, change from frame to frame and may utilise any error correction/recovery techniques which are applied to data.

Alternatively, the watermark may be fragile such that it is damaged should an unauthorised copy be made.

However, the watermark should also preferably be reversible and removable by the owner, if required. Removal may be particularly useful during, for example, a post-production stage to reduce any cumulative effects of the watermark on the underlying work. Also, where information from different sources are edited together it may be desired that a different watermark is applied to the edited product.

End-user equipment may be configured to recognise the watermark such that it will not allow copying of protected works. Alternatively, the equipment may be configured such that it will operate only with works originating from a particular owner, distributed through a particular distributor or where the work contains a particular authorisation code.

The watermark may be extracted by comparing watermarked with non-watermarked data and its authenticity established.

Two techniques for embedding a watermark within the data fields of a digital work will now be described in more detail. The first is to embed the watermark in the spatial domain, the second is to embed the watermark in the frequency domain. Both of these embedding processes should be such that they do not result in a significant degradation of the data being watermarked.

Spatial Domain Watermarks

The process, in overview, involves altering predetermined data bits with the bits of a watermark to produce watermarked data. The existence of watermark may be determined by performing the reverse operation on the watermarked data.

One approach is to embed a watermark by substituting insignificant bits of pseudo-randomly selected data with bits representing the watermark. However, these watermarks are susceptible to destruction by processing the least significant bits of the data. Another is to insert geometric patterns into the data which represent a watermark. However, these watermarks are susceptible to destruction by geometric processing of the data. A further approach is to embed a watermark in a manner which resembles quantisation noise as described with reference to FIG. 5 below and more fully described in articles titled "Embedding Secret Information into a Dithered Multi-Level Image" by K Tanaka et al, IEEE Military Communications Conference pages 216-220, 1990 and "Video Steganography" by K Mitsui, IMA Intellectual Property Proceedings, volume 1, pages 187-296, 1994. However, these watermarks are susceptible to destruction by signal processing, particularly by requantisation of the data.

Referring now to FIG. 5, a source 650 produces a digital data signal 652, such as digital video. A watermark inserter 700 is coupled to the source 650 and receives the digital data signal 652. The watermark inserter 700 applies the watermark 663 by applying the watermark to the digital data signal 652 in a manner that resembles requantisation noise to produce watermarked data 705. A storage device 670 is coupled to the watermark inserter 700 and stores the watermarked data 705.

A yet further approach is to randomly select n pairs of image points ($a_i$, $b_i$) and increase the brightness of $a_i$ by one while decreasing the brightness of $b_i$ by one. Assuming certain statistical properties of the image are satisfied, the sum of the differences of the n pairs of points will be 2n.

Alternatively, where the data signal comprises at least two components (for example [Y, U, V] according to MPEG, PAL or NTC), the watermark may be embedded by assigning values to these components which, in combination, do not usually occur. Also, where a watermark is to be embedded in, for example, video data containing two image fields, a positive watermark may be placed into the first field and a negative watermark into the second field. When watermarked image fields are played there is a masking effect due to the interlacing of the fields and the visual perception of the watermark is significantly reduced.

Frequency Domain Watermarks

The process, in overview, involves obtaining a frequency spectral image of the data to which the watermark is to be applied. The watermark is embedded into predetermined components of the of the frequency spectral image. Thereafter, the watermarked frequency spectral image is subjected to an inverse transform to produce watermarked data. The watermark may be extracted by performing the reverse operation on the watermarked data.

Alternatively, the watermark may be encoded by adjusting every frequency coefficient by a small amount as more fully described in European Patent Application 0 766 468, NEC Corporation. This has the advantage of making the watermark less sensitive to damage, but increases overall noise levels.

Referring now to FIG. 6, a source 650 produces a digital data signal 652, such as digital video. A frequency transformer 655 is coupled to the source 650 and receives the digital data signal 652. The frequency transformer 655 transforms the digital data signal 652 into frequency domain data 657 using, for example, Discrete Cosine Transforms. A watermark inserter 660 is coupled to the frequency transformer and receives the frequency domain data 657. The data is partitioned into blocks and the Discrete Cosine Transform (DCT) of each of these blocks is computed. Thereafter, the frequency coefficients of the blocks are adjusted. A pseudo random subset of blocks is chosen and, in each such block, coefficients of a predetermined subset of frequencies adjusted such that their relative values encode a data bit. The variance in the relative values and the selection of the predetermined subset of frequencies should be such that the watermark is not perceptible. This watermark is sensitive to damage by noise or further processing, whereby it may be removed.

The pseudo-random subset of blocks is selected according to a key stored in the database 636 or generated in the control 638. The data to be embedded is preferably a UMID or an identifier having fewer bits than a UMID but which links to a UMID.

An inverse frequency transformer 665 converts the thus watermarked frequency domain data to spatial domain data. A storage device 670 may store the watermarked data produced by the inverse transformer 665, The system of FIG. 6 is used to produce the watermarked video input at 632 to the remover 640 of FIG. 1.

The system of FIG. 6 is also used as the inserter 642 of FIG. 1

Figure 7:
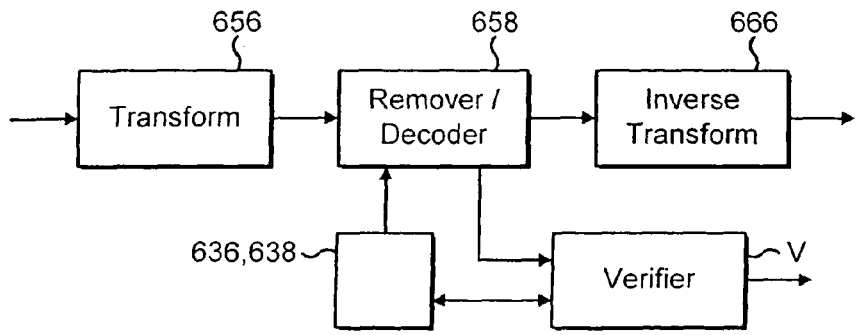
FIG. 7 is a schematic diagram of a watermarking removal technique.

FIG. 7 shows an example of the remover of FIG. 1, for removing watermarks produced by the inserter of FIG. 6.

A transformer 656 receives the watermarked video and transforms it using a Discrete Cosine Transform.

The database 636 or the generator 638 provides the key by which the pseudo random subset of blocks is selected by a remover and decoder 658. The remover/decoder 658 decodes the watermark data from the selected blocks.

The remover/decoder then applies a process to the selected block which effectively removes the watermark, e.g. by adding noise preferably so as to not significantly degrade the video.

The decoded data is provided to a verifier V which authenticates the data, e.g. by comparing it with data stored in the database 636. If the authentication fails, the processor 646 of FIG. 1 may be disabled.

An inverse transforms receives the frequency domain data from the remover/decoder 658 and inverse transforms it to spatial domain data.

Modifications

It will be appreciated that the data is digital data in the foregoing embodiments. Thus the invention may be implemented using programmable digital signal processors. Thus the invention may be embodied in software, and stored in recording media.

Although for convenience the foregoing describes video processing, the invention may be applied to audio processing. UMIDs are long e.g. 32 or 64 bytes. The material may be identified by an identifier, in the material, and which has fewer bits than a UMID but which links the material to a UMID which uniquely identifies the material.

Whilst the foregoing description illustrates the invention by reference to video material, the invention may be applied to any one or more of video material, audio material, and data material.

It will be appreciated that other watermarking techniques may be used and that other ways of removing watermarks may be used. In principle, a watermark may be removed by applying a process which is the inverse of the embedding process thus providing in principle precise removal.

The invention claimed is:

1. A material processing system for processing material including a watermark, the material having been watermarked by combining a watermark code word with predetermined components of the material, the system comprising:
   a remover for automatically removing the watermark from the material, independently of a user in a closed system to which the user does not have access,
   a processor programmed to process the material from which the watermark has been removed, and
   an inserter for automatically inserting a watermark into the processed material independently of the user in a closed system to which the user does not have access, wherein the remover is arranged to receive data enabling the removal of the watermark code word from the material to be processed, the enabling data indicating the predetermined components of the material with which the watermark code word has been combined, wherein
   the material has been watermarked by encrypting the watermark code word before the watermark code word is combined with the predetermined components of the material, and
   the enabling data includes an encryption key for decrypting the encrypted watermark, the remover configured to remove automatically the encrypted watermark from the material and to decrypt the encrypted watermark.

2. A system according to claim 1, wherein the processor has a user interface for controlling the processes performed thereby.

3. A system according to claim 1, comprising a database processor linked to the remover, the database processor containing the data enabling the removal of the watermark from the material to be processed, the database processor being operable to provide the enabling data to the remover.

4. A system according to claim 1, comprising a database processor linked to the inserter, the database processor containing the data enabling the insertion of the watermark into the processed material, the database processor being operable to provide data enabling insertion of the watermark into the processed material to the inserter.

5. A system according to claim 1, wherein the inserter is operable to encrypt the watermark, using an encryption key, before the watermark is automatically inserted into the material.

6. A system according to claim 3, wherein the remover is linked to the database processor by a communications link.

7. A system according to claim 4, wherein the inserter is linked to the database processor by a communications link.

8. A system according to claim 6, wherein the communications link includes the internet.

9. A system according to claim 7, wherein the communications link includes the internet.

10. A system according to claim 1, wherein the remover is operable to check the authenticity of the material including the watermark.

11. A system according to claim 10, wherein the processor is arranged to be disabled, if the material fails the authenticity check.

12. A system according to claim 1, wherein the watermark code word removed from the material by the remover is different from the watermark code word inserted into the material by the inserter.

13. A system according to claim 1, wherein the watermark code word removed from the material by the remover includes a first UMID, and in dependence upon the processing performed on the material by the processor, the watermark code word inserted into the material by the inserter includes a second UMID, the second UMID being generated in accordance with the pressing performed by the processor to produce the processed material.

14. A method of processing watermarked material, the material having been watermarked by combining a watermark code word with predetermined components of the material, the method comprising:
   automatically removing the watermark from the material, independently of a user in a closed system to which the user does not have access;
   processing the material from which the watermark has been removed;
   automatically inserting a watermark into the processed material independently of the user in a closed system to which the user does not have access, wherein the removing includes
   receiving data enabling the removal of the watermark code word from the material to be processed, the enabling data indicating the predetermined components of the material with which the watermark code word has been combined, and
   removing the watermark code word automatically from the predetermined components of the material; and
   encrypting the watermark code word before the watermark code word is combined with the predetermined components of the material, wherein the enabling data includes an encryption key for decrypting the encrypted watermark, the removing the watermark from the material including
   automatically removing the encrypted watermark from the material, and
   decrypting the encrypted watermark.

15. A method according to claim 14, comprising controlling the processing of the material using a user interface.

16. A method according to claim 14, wherein the removing the watermark code word includes provinding the enabling data from a database processor, the database processor containing the data enabling the removal of the watermark from the material to be processed, and removing the watermark code word from the material using the enabling data.

17. A method according to claim 14, wherein the inserting the watermark code word includes providing the enabling data from a database processor, the database processor containing the data enabling the insertion of the watermark into the material, and inserting the watermark code word into the material using the enabling data.

18. A method according to claim 14, comprising encrypting the watermark, using an encryption key, before the watermark is automatically inserted into the material.

19. A method according to claim 14, comprising checking the authenticity of the material including the watermark.

20. A method according to claim 19, comprising disabling the processing of the material, if the material fails the authenticity check.

21. A method according to claim 14, wherein the watermark code word removed from the material is different from the watermark code word inserted into the material.

22. A method according to claim 14, wherein the watermark code word removed from the material includes a first UMID, and in dependence upon the processing performed on the material, the watermark code word inserted into the material includes a second UMID, the second UMID being generated in accordance with the pressing performed to produce the processed material.

23. A non-transitory computer readable medium having computer readable instructions that when executed by a processor performs a method comprising:

automatically removing a watermark from material, independently of a user in a closed system to which the user does not have access, the watermark having been previously added by combining a watermark code word with predetermined components of the material;

processing the material from which the watermark has been removed;

automatically inserting a watermark into the processed material independently of the user in a closed system to which the user does not have access, wherein the removing includes receiving data enabling the removal of the watermark code word from the material to be processed, the enabling data indicating the predetermined components of the material with which the watermark code word has been combined, and removing the watermark code word automatically from the predetermined components of the material; and encrypting the watermark code word before the watermark code word is combined with the predetermined components of the material, wherein the enabling data includes an encryption key for decrypting the encrypted watermark, the removing the watermark from the material including automatically removing the encrypted watermark from the material, and decrypting the encrypted watermark.

* * * * *